United States Patent
Ishikawa

(10) Patent No.: US 10,204,294 B2
(45) Date of Patent: Feb. 12, 2019

(54) IMAGE PROCESSING DEVICE, IMAGE FORMING APPARATUS, AND IMAGE PROCESSING METHOD FOR AUTOMATICALLY DETERMINING WHETHER AN IMAGE IS A COLOR IMAGE

(71) Applicant: Takumi Ishikawa, Kanagawa (JP)

(72) Inventor: Takumi Ishikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/620,012

(22) Filed: Jun. 12, 2017

(65) Prior Publication Data
US 2018/0005094 A1 Jan. 4, 2018

(30) Foreign Application Priority Data

Jul. 1, 2016 (JP) .................................. 2016-131953
Feb. 28, 2017 (JP) .................................. 2017-036774

(51) Int. Cl.
| G06K 15/00 | (2006.01) |
| G06K 15/02 | (2006.01) |
| H04N 1/409 | (2006.01) |
| H04N 1/60 | (2006.01) |
| H04N 1/405 | (2006.01) |

(52) U.S. Cl.
CPC ..... *G06K 15/1871* (2013.01); *G06K 15/1872* (2013.01); *H04N 1/4092* (2013.01); *H04N 1/6027* (2013.01); *H04N 1/6072* (2013.01); *G06K 15/188* (2013.01); *G06K 15/1878* (2013.01); *H04N 1/405* (2013.01); *H04N 1/60* (2013.01)

(58) Field of Classification Search
CPC combination set(s) only.
See application file for complete search history.

(56) References Cited

U.S. PATENT DOCUMENTS

| 8,810,861 | B2 * | 8/2014 | Yamakawa | H04N 1/4097 358/3.26 |
| 2004/0165081 | A1 * | 8/2004 | Shibaki | H04N 1/56 348/222.1 |
| 2004/0252316 | A1 * | 12/2004 | Miyagi | H04N 1/40062 358/1.9 |
| 2008/0062483 | A1 * | 3/2008 | Morimoto | H04N 1/56 358/530 |

(Continued)

FOREIGN PATENT DOCUMENTS

| JP | 2000-230907 | 8/2000 |
| JP | 2005-064800 | 3/2005 |

(Continued)

*Primary Examiner* — Barbara Reinier
(74) *Attorney, Agent, or Firm* — Harness, Dickey & Pierce, P.L.C.

(57) ABSTRACT

An image processing device includes circuitry to segment an image corresponding to input image data into a black text area including black text and a non-black text area of the image data other than the black text area, perform a first type of color correction on pixel data items in the black text area and a second type of color correction on pixel data items in the non-black text area to generate a processed image, and determine whether or not the image is a color image using the processed image. The second type of color correction is different from the first type of color correction.

12 Claims, 7 Drawing Sheets

(56) References Cited

U.S. PATENT DOCUMENTS

2012/0293843 A1* 11/2012 Yamakawa .......... H04N 1/4097
                                                         358/448
2015/0248777 A1*  9/2015 Konishi ................ G06F 17/289
                                                         345/441

FOREIGN PATENT DOCUMENTS

| JP | 2008-206186 | 9/2008 |
| JP | 2011-082746 | 4/2011 |

* cited by examiner

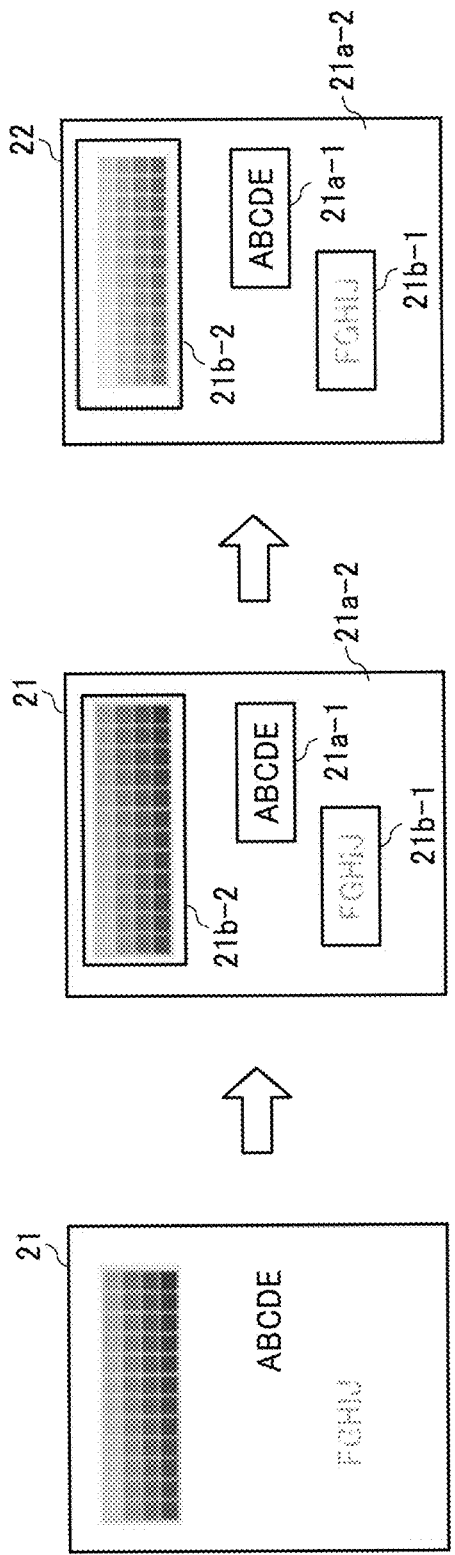

FIG. 3A
INPUT IMAGE
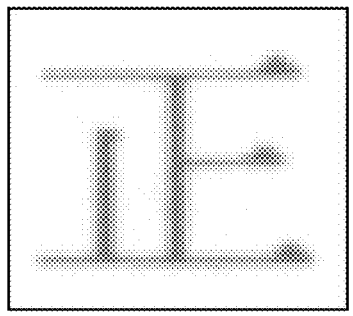
[RGB VALUE IN BLACK PART]
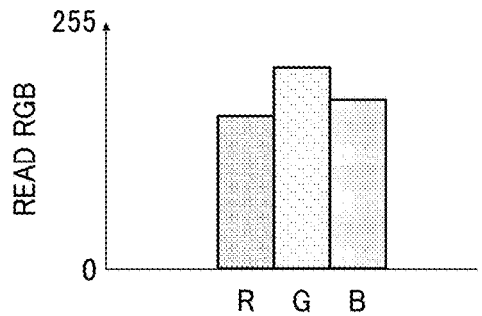
FIG. 3B
IMAGE AFTER COLOR CORRECTION
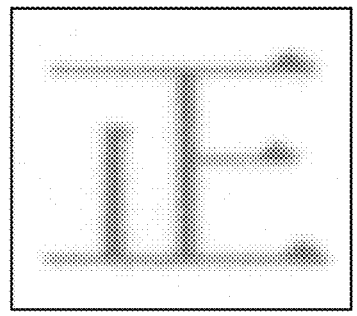
[RGB VALUE IN BLACK PART]
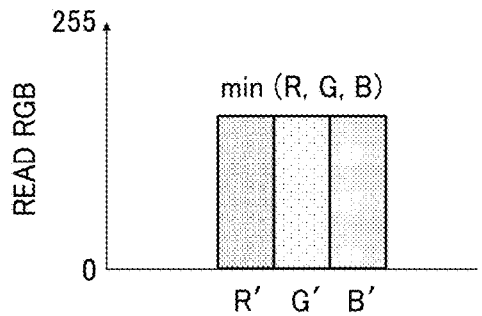

FIG. 4
IMAGE AFTER COLOR CORRECTION
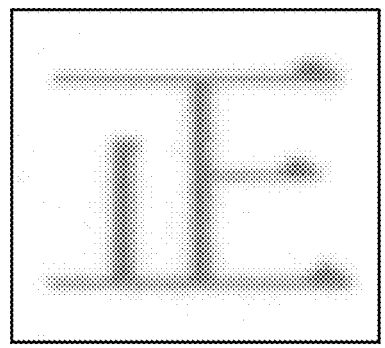
[RGB VALUE IN BLACK PART]
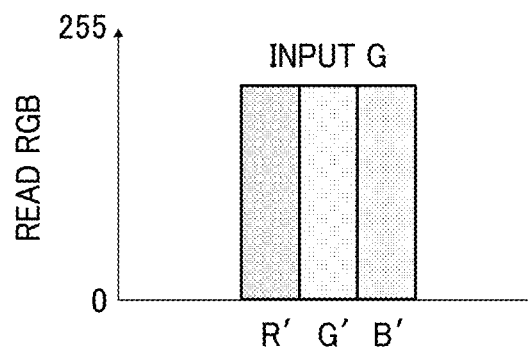

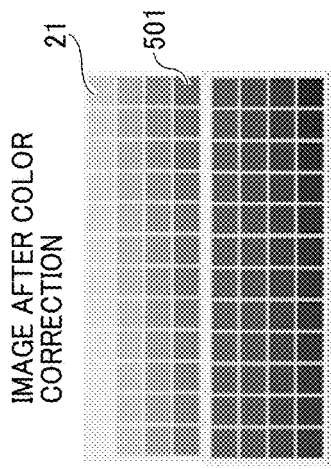
FIG. 5A
INPUT IMAGE
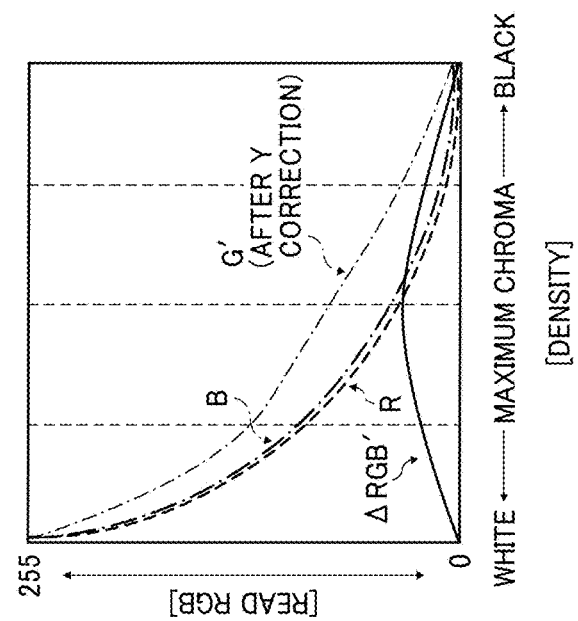
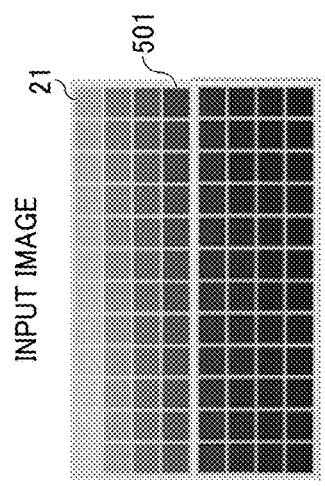
FIG. 5B
IMAGE AFTER COLOR CORRECTION
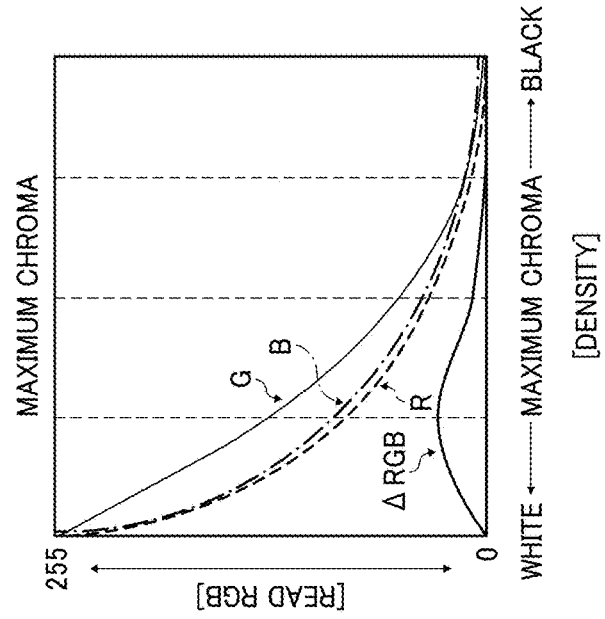

IMAGE PROCESSING DEVICE, IMAGE FORMING APPARATUS, AND IMAGE PROCESSING METHOD FOR AUTOMATICALLY DETERMINING WHETHER AN IMAGE IS A COLOR IMAGE

CROSS-REFERENCE TO RELATED APPLICATIONS

This patent application is based on and claims priority pursuant to 35 U.S.C. § 119(a) to Japanese Patent Application Nos. 2016-131953, filed on Jul. 1, 2016 and 2017-036774, filed on Feb. 28, 2017, in the Japan Patent Office, the entire disclosure of which are hereby incorporated by reference herein.

BACKGROUND

Technical Field

Embodiments of the present disclosure relate to an image processing device, an image forming apparatus, and a method for processing an image.

Related Art

Some image forming apparatuses, which read a document image and form the read document image, implement an automatic color selection (ACS) function that automatically determines whether the document image is a color image or not.

Such image forming apparatuses can form the same type of image as the document image on a recording medium without user's operation of selecting a type of image to be formed on the recording medium.

SUMMARY

An improved image processing device includes circuitry to segment an image corresponding to input image data, into a black text area including black text and a non-black text area of the image data other than the black text area, perform a first type of color correction on pixel data items in the black text area and a second type of color correction on pixel data items in the non-black text area to generate a processed image, and determine whether or not the image is a color image using the processed image. The second type of color correction is different from the first type of color correction.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 2 is an illustration of area extraction and color correction performed according to an area type;

FIGS. 3A and 3B are illustrations of an example of a first type of color correction that is performed on a black text area;

FIG. 4 is an illustration of another example of the first type of color correction performed on the black text area;

FIG. 5A and FIG. 5B are illustrations of an example of a second type of color correction performed on a graphic area;

DETAILED DESCRIPTION

Figure 1:
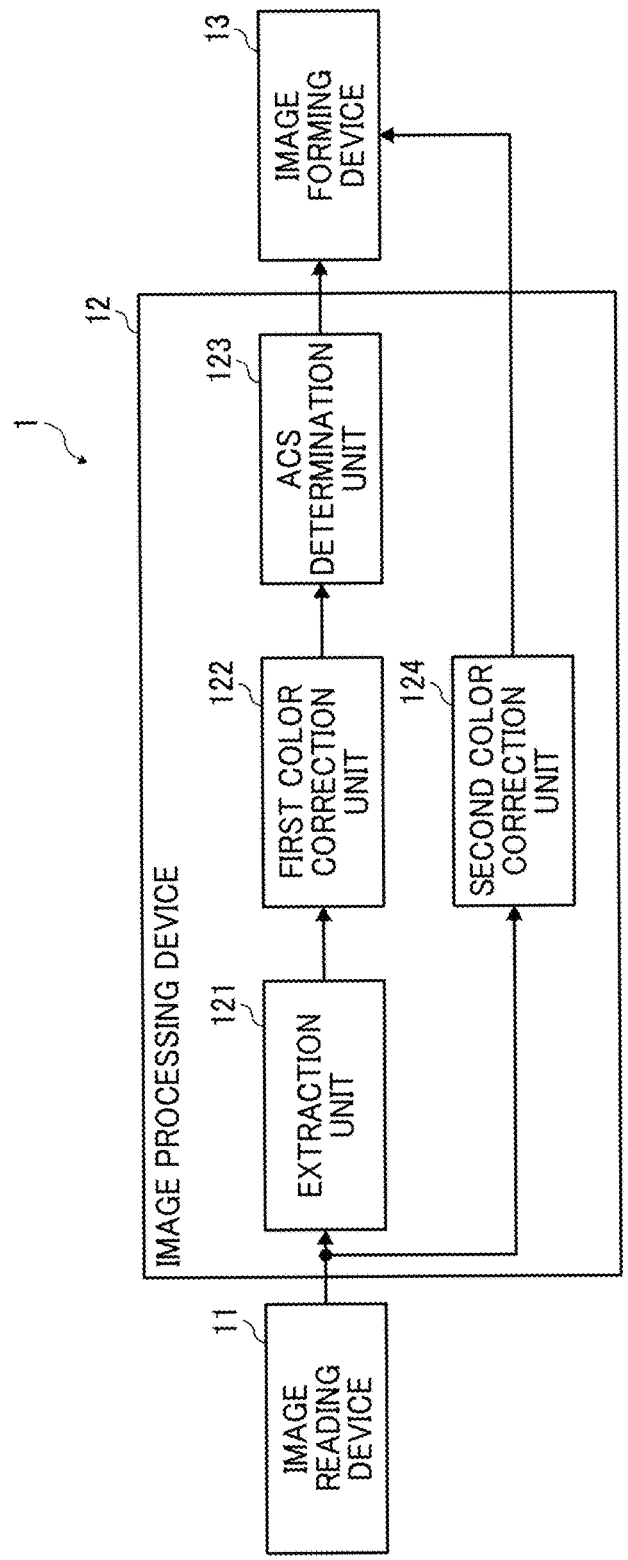
FIG. 1 is a schematic diagram illustrating an example of a configuration of an image forming apparatus including an image processing device according to one embodiment of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Embodiments of the present disclosure are described below in detail with reference to the drawings. FIG. 1 is a schematic diagram illustrating an example of a configuration of an image forming apparatus 1 including an image processing device 12 according to one of the embodiments.

As illustrated in FIG. 1, the image forming apparatus 1 includes an image reading device 11, the image processing device 12, and an image forming device 13.

The image reading device 11 is specifically a scanner or a component including the scanner. The image reading device 11 reads a document image, namely an image on a document set on or conveyed to a document plate, and outputs image data to the image processing device 12.

The image processing device 12 is a type of information processing device, and inputs (receives) the image data output from the image reading device 11 and performs predetermined image processing on the image data.

The image processing device 12 provides an automatic color selection (ACS) function, as a part of the image processing, to determine whether the document image corresponding to the image data being input is a color image. To implement the ACS function, the image processing device 12 includes an extraction unit 121, a first color correction unit 122, and an ACS determination unit 123.

The extraction unit 121 segments the document image corresponding to the image data into a black text area and a non-black text area, and extracts each area from the document image according to the type of area.

The black text area, here, is defined as an area includes, as configuration elements, pixels perceived as achromatic (achromatic pixels). For example, the black text area is configured with a black text (black pixels) and a background (e.g. white pixels). In other words, the black text area includes an area configured with the black pixels and the white pixels corresponding to the background, or an area configured with only the black pixels, or only the white pixels. The non-black text area is an area other than the black text area, namely the non-black text area that includes pixels perceived as chromatic (chromatic pixels). The non-black text area is also, hereinafter, referred to as a graphic area. The extraction of the areas as described above is performed by known techniques.

The first color correction unit 122 inputs, or receives, a result of extraction performed with the extraction unit 121 and the image data, and performs first color correction on the image data including pixel data items, each of which has a pixel value of a color component, by changing the value of each pixel. The first color correction includes different types of color correction, which are described later in detail, depending on whether area is the black text area or the non-black text area (graphic area). The first color correction may also be, hereinafter, referred to as simply "color correction".

Types of image data to be subjected to the first color correction are not particularly limited. Here, the type of image data is assumed to include pixels individually being presented with color components of red (R), green (G), and blue (B), for easy understanding. The value of color component of R is indicated as, for example, an "R value" or an "R graduation value". The same applies to the values of color components of G and B.

The ACS determination unit 123 determines whether or not the document image is a color image using the image data after the first color correction (color-corrected image data). The image data obtained as a result of the determination and image data to which a predetermined image processing is performed are output to the image forming device 13. In the embodiment, determining whether the document image is a color image also means determining whether the document image is a color image or a monochrome image, for example.

The image forming device 13 forms an image, that is, outputs the image data read by the image reading device 11 onto a recording medium. On this image data, a second color correction unit (corrector) 124 may perform a second color correction, which is different from the first color correction and set in advance in the image forming apparatus 1 or selected by a user. In this case, the image forming device 13 may form the image on the recording medium after the second color correction unit 124 of the image processing device 12 performs the second color correction on the image data.

The second color correction unit 124 is a processing unit that processes image data for forming an image, so that the purpose of the second color correction performed with the second color correction unit 124 is different from that of the first color correction performed with the first color correction unit 122. That is, the first color correction performed with the first color correction unit 122 is a color correction performed on the image data for the ACS determination. By contrast, the second color correction performed with the second color correction unit 124 is used to form an image. The image forming device 13 includes an operation device operated by the user and a controller to control the entire image forming apparatus 1. Accordingly, the image forming device 13 causes the image reading device 11 to read the document image and the image processing device 12 to process the image data.

FIG. 2 is an illustration of area extraction and the first color correction performed according to type of area. In FIG. 2, a document image 21 becomes a color-corrected document image 22 after the first color correction is performed on the document image 21. Each of the document image 21 and the color-corrected document image 22 includes a black text area 21a and a non-black text area (graphic area) 21b.

As illustrated in FIG. 2, the document image 21 includes the black text area 21a-1 where text block "ABCDE" is printed, the graphic area 21b-1 where text block "FGHIJ" is printed with non-black color, and the graphic area 21b-2 where a graphic is printed. These three areas (one black text area 21a-1 and two graphic areas 21b-1 and 21b-2) are extracted and separated from the document image 21 with the extraction unit 121. Additionally, an area in the document image 21 of FIG. 2 other than the three areas mentioned above is extracted as the black text area 21a-2. This is because this black text area 21a-2 is perceived as a uniform background (e.g., all white pixels).

As mentioned above, different types of the first color correction are performed on each type of area. Depending on which type of color correction, a different operation is performed in relation to each value of pixel data, one of the R value, the G value, and the B value. Each type of color correction performed according to the type of area is described more specifically with reference to FIGS. 3A and 3B and FIG. 4.

FIGS. 3A and 3B are illustrations of an example of the first type of color correction that is performed on the black text area. FIG. 3A illustrates an image of black text area and a graph presenting pixel data before the first color correction, which is the first type of color correction, is performed, and FIG. 3B illustrates an image of black text area and a graph presenting pixel data after the first color correction, which is the first type of color correction, is performed.

As illustrated with the graph in FIG. 3A, color deviation occurs in the image obtained by outputting the document image 21 due to characteristics of the scanner. The image data obtained by outputting the document image 21 is image data on which the necessary correction is previously performed. The color deviation is caused by a difference in the values of each of R, G, and B included in the image data. That is, a difference in the gradation values (for example, a value that is calculated by: maximum value in the gradation values minus minimum value in the gradation values) is larger than a predetermined threshold in the image data including pixels of black (the black pixels) and pixels of white (the white pixels), of which the gradation values of R, G, and B are supposed to be identical each other, or the difference in the gradation values of R, G, B is supposed to be small. Color of the pixels where the difference value in the gradation values is larger than the predetermined threshold are regarded as chromatic. A pixel that is originally an achromatic pixel is identified as a chromatic pixel, and this adversely affects precision in determining whether the image is a color image or not.

To cope with this, the first type of first color correction that adjusts the gradation values of pixels (pixel data items) so that they are identical identifies the pixels as achromatic pixels, as illustrated with the graph in FIG. 3B in the embodiment. The minimum value among the gradation values of R, G, and B is set as a shared or common gradation value.

Alternatively, a value other than the minimum value among the gradation values of R, G, and B may be used as an identical gradation value to be set. For example, the maximum value may be used as a value to be set as an identical gradation value as illustrated in FIG. 4. Alternatively, the gradation value in common to be set may be one of the maximum value and the minimum value of the gradation values of R, G, and B. The first type of color correction may include not only setting the same gradation values, but also decreasing differences among the gradation values. As described above, the first type of color correction according to the present embodiment may be implemented with various modified aspects.

FIG. 5A and FIG. 5B are illustrations of an example of the second type of color correction that is performed on the graphic area. FIG. 5A illustrates an input image and a graph indicating change in the gradation value in each of R, G, and B before the second type of color correction is performed, and FIG. 5B illustrates an input image and a graph indicating change in the gradation value in each of R, G, and B after the second type of color correction is performed. In the graphs of FIG. 5A and FIG. 5B, the horizontal axis represents a density and the vertical axis represents a gradation value (0-255). Curves illustrated in each graph of FIG. 5A and FIG. 5B indicate individually R, B, and G in this order from the side in which the density is low.

The input image illustrated in both of FIG. 5A and FIG. 5B, is obtained by reading, with the image reading device 11, the document image 21 in which colors are arranged, from white to the maximum color chroma (green) and the maximum color chroma (green) to black. Accordingly, the numeral reference, 21, is assigned to the document image 21 in FIG. 5A and in FIG. 5B.

The density of the document image 21 (input image) increases toward the lower right in the graph. An area 501 is printed with a color of the maximum color chroma.

In this document image 21, ΔRGB, which indicates a difference in values of R, G, and B from the maximum color chroma to the black, is low, as illustrated in the graph of FIG. 5A. Here, ΔRGB is obtained using the maximum value in the gradation values minus the minimum value in the gradation values. This causes image characteristics in which a change in density (color) is hard to discern, namely gradation is lost. In other words, the document image 21 before the color correction has image characteristics in which the gradation of colors is hard to discern. Accordingly, it is hard to determine chromatic or achromatic appropriately with the document image 21 before the color correction. This decreases the precision in determining whether the document image 21 is color image or not.

To cope with this, the second type of color correction, in which ΔRGB is set to be the maximum in relation to the G value at a position of the maximum color chroma, is performed. With this color correction, ΔRGB increases as the density varies from the white to the maximum color chroma and decreases as the density varies from the maximum color chroma to the black. Thus, the calculated color chroma varies widely depending on the density. As a result, the chromatic and the achromatic are determined with great precision.

This color correction, which is the second type of color correction, is performed using the following formulas (1) to (3); namely, each of gradation values after color correction R', B', and G' is calculated as follows using each of the original gradation values of R, G, and B.

$$R' = \alpha 11 \times R + \alpha 12 \times G + \alpha 13 + \beta 1 \quad (1)$$

$$G' = \alpha 21 \times R + \alpha 22 \times G + \alpha 23 + \beta 2 \quad (2)$$

$$B' = \alpha 31 \times R + \alpha 32 \times G + a33\beta 3 \quad (3)$$

Here, α11 to α33 and β1 to β3 are predetermined coefficients.

According to the present embodiment, ΔRGB need not always be at its maximum at the position of the maximum color chroma. In other words, the second type of color correction may be performed in a manner that ΔRGB of the color-corrected data is at its maximum at a position closer to the maximum color chroma than original ΔRGB of the image data read by the image reading device 11.

Additionally, although in the present embodiment, target colors to be corrected are specified as R, G, and B, not all of these three colors need be specified as target colors. Also, the target colors may be different from these three colors of R, G, and B. The target colors may be selected according to a type (color space) of the image data.

As described above, different types of color correction are performed on each type of area. That is, after extracting the area, the color correction that improves the determination precision of the chromatic and the achromatic of the pixels using the extracted area according to the type of area is performed. With this color correction (first color correction), a value of the pixel data on the black text area is set to be determined as an achromatic, and a value of the pixel data on the graphic area is set to a value with which achromatic and an achromatic can be determined with high precision.

As described above, two steps of processing are performed to generate image data to be determined whether the image data is a color image or not. With the image data, the result of the separation of the areas can be examined in detail. Through this, the process can be performed with high precision in the ACS determination using the image data.

Additionally, a threshold is not set or changed, so that variation of the precision for the ACS determination of the document image 21 can be suppressed or reduced. Accordingly, compared to the correction including setting the threshold, the precision for the ACS determination can be highly maintained.

The ACS determination unit 123 inputs the image data generated with the first color correction unit 122, determines whether each pixel is the chromatic pixel or the achromatic pixel using the image data, and performs the ACS determination of the document image 21 based on results of the determination. Known techniques may be used to determine whether the pixel is the chromatic pixel or the achromatic pixel and perform the ACS determination of the document image 21 based on the results of the determination.

Whether the pixel is the chromatic pixel or the achromatic pixel may be determined depending on, for example, whether the difference in the values of R, G, and B is equal to or more than a threshold or not. Alternatively, whether the pixel is the chromatic pixel or the achromatic pixel may be determined depending on, for example, whether the difference between the maximum value and the minimum value in the values of R, G, and B is equal to or more than the threshold or not. That is, a pixel having a difference value that is equal to or more than the threshold may be determined to be the chromatic pixel. Alternatively, assuming there are blocks of M×N (M and N are integer numbers equal to or more than 1), pixels in the blocks are classified by a hue, and the determination of chromatic or achromatic for the target pixel may be performed according to a profile of the hue in the blocks.

The ACS determination may be performed by considering a ratio of the chromatic pixels out of all pixels, or the number of successive pixels that are determined as the chromatic pixels.

Figure 6:
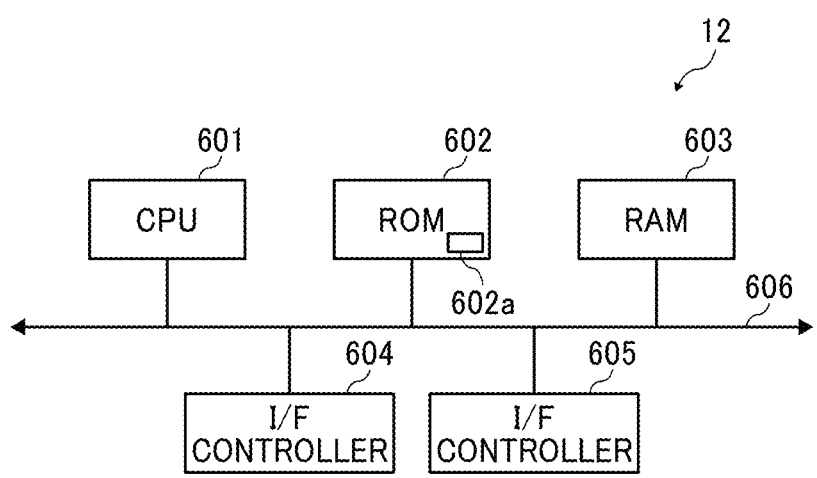
FIG. 6 is a block diagram illustrating an example of a hardware configuration of the image processing device.

FIG. 6 is a block diagram illustrating an example hardware configuration of the image processing device 12. A hardware configuration of an information processing device that can be used as the image processing device 12 is described with reference to FIG. 6.

The information processing device being able to be used as the image processing device 12 includes, for example, a central processing unit (CPU) 601, a random access memory (RAM) 603, two interface (I/F) controllers 604 and 605, and a bus 606.

The ROM 602 stores a program to perform the ACS determination (hereinafter, referred to as an "ACS determination program") 602a. The CPU 601 reads the ACS determination program 602a from the ROM 602 to the RAM 603 and executes the ACS determination program 602a to perform the ACS determination including the extraction or separation of the areas. The RAM 603 is also used to store the image data. Accordingly, the extraction unit 121, the first color correction unit 122, and the ACS determination unit 123 are implemented using the CPU 601, according to a control program read from the ROM 602 onto the RAM 603.

One of the two I/F controllers 604 and 605, which functions as a receiver, is used to receive the image data transferred from the image reading device 11. The other of the two I/F controllers 604 and 605, which functions as a transmitter, which functions as a transmitter, is used to send a result of the ACS determination and the image data after the image processing to the image forming device 13.

Figure 7:
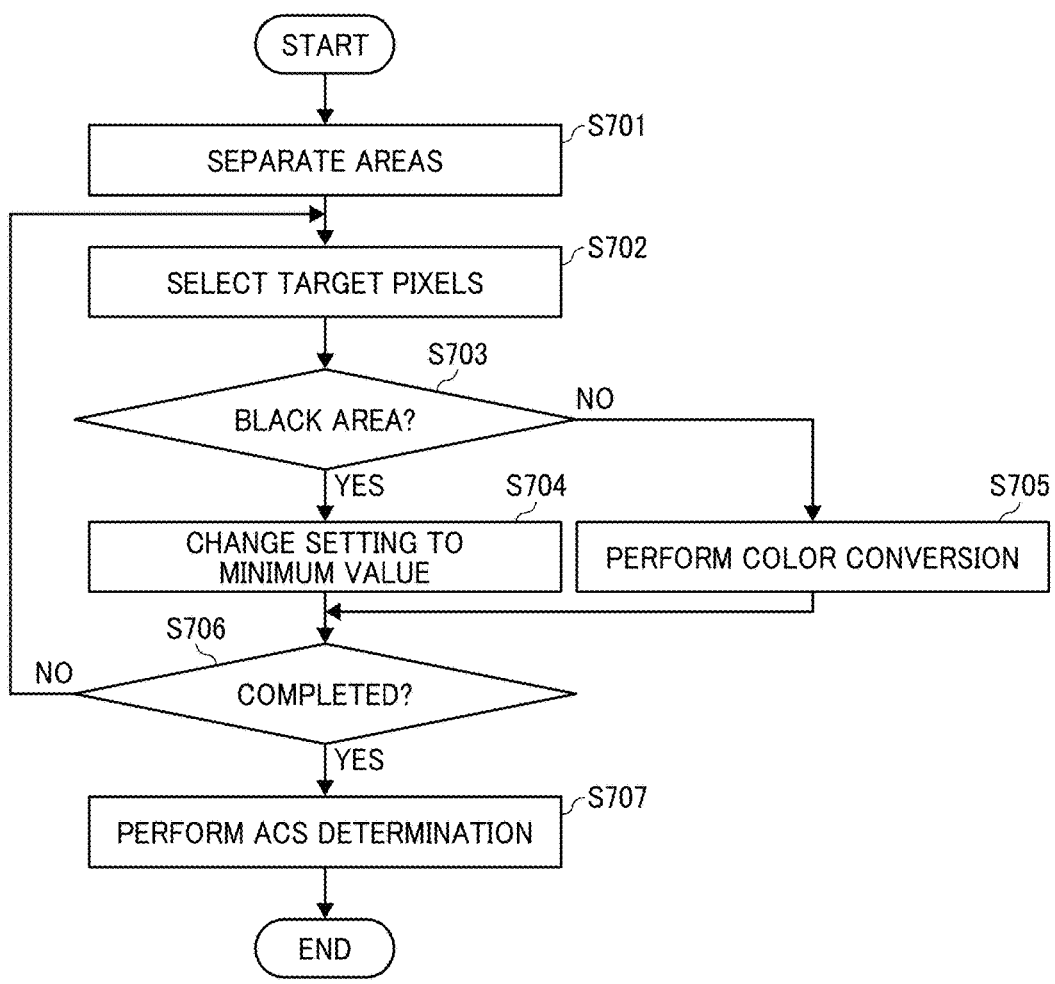
FIG. 7 is a flowchart illustrating a process of automatic color selection (ACS) determination.

FIG. 7 is a flowchart illustrating a process of the ACS determination. The process of the ACS determination is performed by the CPU 601, in accordance with the ACS determination program 602a. More specifically, the CPU 601 reads the ACS determination program 602a stored in the ROM 602 to the RAM 603 and executes the ACS determination program 602a. The ACS determination is performed in response to, for example, an input of the image data from the image reading device 11. The ACS determination is described in detail with reference to FIG. 7 below.

In executing the ACS determination program 602a, the CPU 601 refers the image data and extracts the black text area and the graphic area from the document image 21 corresponding to the image data to segment the areas (S701). Here, to "extract" means a process to identify a position of the pixels or the area subjected to be extracted.

Subsequently, the CPU 601 selects a target pixel data item from the image data (S702). The CPU 601 determines whether the selected pixel data item is included in the black text area (S703). When the target pixel data item is included in the black text area, that is, S703 is YES, the process continues to S704. When the target pixel data item is included in the graphic area, that is, S703 is NO, the process continues to S705.

In S704, the CPU 601 specifies the minimum value in gradation values of R, G, and B presented by the pixel data item, and sets the specified minimum value of the gradation value to each of gradation values of R, G, and B. Then, the process proceeds to S706.

On the other hand, in S705, the CPU 601 performs color conversion for the color correction to change each gradation value of R, G, and B to each gradation value of R', B' and G' calculated using, for example, the above mentioned formula (1) to (3). Then, the process proceeds to S706.

In S706, the CPU 601 determines whether the color correction for all pixel data is completed. When the color correction for all pixel data is completed, that is, S706 is YES, the process continues to S707. When the pixel data item subject to the color correction remains, the determination of S706 is NO and the process returns to S602. As described above, the process repeats from S702 to S706 until the determination of S706 is YES.

In S707, the CPU 601 determines whether each pixel data item is chromatic or achromatic, and performs the ACS determination to determine the document image 21 is a color image using a result of the determination on each pixel data item. After performing the ACS determination, the process of the ACS determination is completed.

The embodiment is described in a manner that the image processing device 12, which is the information processing device, is implemented in the image forming apparatus 1, however it is not limited to implement the image processing device 12 in the image forming apparatus 1. The ACS determination may be performed by other information processing devices that are different from the image forming apparatus 1.

Additionally, the color correction may be desirably performed by preparing a different type of color correction as a user selectable option for at least one of the black text area and the graphic area and setting or changing settings for the color correction by the user. As described above, the types of the color correction is not in particularly limited to the embodiment.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the exemplary embodiments of the disclosure have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An image processing device, comprising circuitry to:
a memory configured to store computer-readable instructions; and
a processor configured to execute the computer-readable instructions to
segment an image corresponding to input image data, into a black text area including black text and a non-black text area including at least one of color text and a graphic, the black text area including first pixel data items and the non-black text area including second pixel data items;
perform a first type of color correction on the first pixel data items in the black text area, each of the first pixel data items having first pixel values of a plurality of color components, to generate color-corrected first pixel data items based on adjusting one or more of the first pixel values to reduce a difference between the first pixel values;
perform a second type of color correction on the second pixel data items in the non-black text area, each of the second pixel data items having second pixel values of the plurality of color components, to generate color-corrected second pixel data items based on approximating a maximum difference between the second pixel values to a maximum color chroma;

generate a processed image corresponding to the input image data, the processed image including the color-corrected first and second pixel data items;

determine whether each pixel data item of the processed image is chromatic or achromatic based on the color-corrected first and second pixel data items; and determine whether the image is a color image or a monochrome image based on a result of the determination on each pixel data item.

2. The image processing device of claim 1, wherein performing the first type of color correction on the first pixel data items in the black text area includes
   determining at least one of a minimum value and a maximum value among the first pixel values, and
   setting one of the minimum value or the maximum value among the first pixel values as a common pixel value of each of the plurality of color components.

3. The image processing device of claim 1, wherein performing the second type of color correction on the second pixel data items in the non-black text area includes setting a difference between the second pixel values to be the maximum difference in relation to one of the second pixel values at a position of the maximum color chroma.

4. The image processing device of claim 3, wherein the second type of color correction is processing that sets the maximum difference in the second pixel values of the plurality of color components each expressing a different color in a pixel to the maximum color chroma of one or more of the colors that are specified.

5. An image forming apparatus, comprising:
   the image processing device according to claim 1; and
   an image forming device configured to output the image data onto a recording medium based on a result of the determination of whether the image is a color image or a monochrome image.

6. The image processing device of claim 1, wherein determining whether each pixel data item of the processed image is chromatic or achromatic includes one of
   determining whether the difference between the first pixel values and the second pixel values is equal to or greater than a threshold, respectively, and
   determining whether the difference between the maximum value and the minimum value in the first pixel values and the second pixel values is equal to or greater than the threshold, respectively,
   wherein a pixel data item having a difference value that is equal to or greater than the threshold is determined to be chromatic and a pixel data item having a difference value that is less than the threshold is determined to be achromatic.

7. The image processing device of claim 6, wherein determining whether the image is a color image or a monochrome image is performed based on a ratio of chromatic pixels out of all pixels or a number of successive pixels that are determined to be chromatic.

8. A method, comprising:
   segmenting an image corresponding to input image data, into a black text area including black text and a non-black text area including at least one of color text and a graphic, the black text area including first pixel data items and the non-black text area including second pixel data items;
   performing a first type of color correction on the first pixel data items in the black text area, each of the first pixel data items having first pixel values of a plurality of color components, to generate color-corrected first pixel data items based on adjusting one or more of the first pixel values to reduce a difference between the first pixel values;
   performing a second type of color correction on the second pixel data items in the non-black text area, each of the second pixel data items having second pixel values of the plurality of color components, to generate color-corrected second pixel data items based on approximating a maximum difference between the second pixel values to a maximum color chroma;
   generating a processed image corresponding to the input image data, the processed image including the color-corrected first and second pixel data items;
   determining whether each pixel data item of the processed image is chromatic or achromatic based on the color-corrected first and second pixel data items; and
   determining whether the image is a color image or a monochrome image based on a result of the determination on each pixel data item.

9. The method of claim 8, wherein performing the first type of color correction on the first pixel data items in the black text area includes
   determining at least one of a minimum value and a maximum value among the first pixel values, and
   setting one of the minimum value or the maximum value among the first pixel values as a common value of each of the plurality of color components.

10. The method of claim 8, wherein performing the second type of color correction on the second pixel data items in the non-black text area includes setting a difference between the second pixel values of the plurality of color components each expressing a different color in a pixel to be the maximum difference in relation to one of the second pixel values at a position of the maximum color chroma of one or more of the colors that are specified.

11. The method of claim 8, wherein determining whether each pixel data item of the processed image is chromatic or achromatic includes one of
   determining whether the difference between the first pixel values and the second pixel values is equal to or greater than a threshold, respectively, and
   determining whether the difference between the maximum value and the minimum value in the first pixel values and the second pixel values is equal to or greater than the threshold, respectively,
   wherein a pixel data item having a difference value that is equal to or greater than the threshold is determined to be chromatic and a pixel data item having a difference value that is less than the threshold is determined to be achromatic.

12. The method of claim 11, wherein determining whether the image is a color image or a monochrome image is performed based on a ratio of chromatic pixels out of all pixels or a number of successive pixels that are determined to be chromatic.

* * * * *